Aug. 14, 1928.
A. KLEINLERCHER
1,680,792
COFFEE URN
Filed Jan. 13, 1927
3 Sheets-Sheet 1
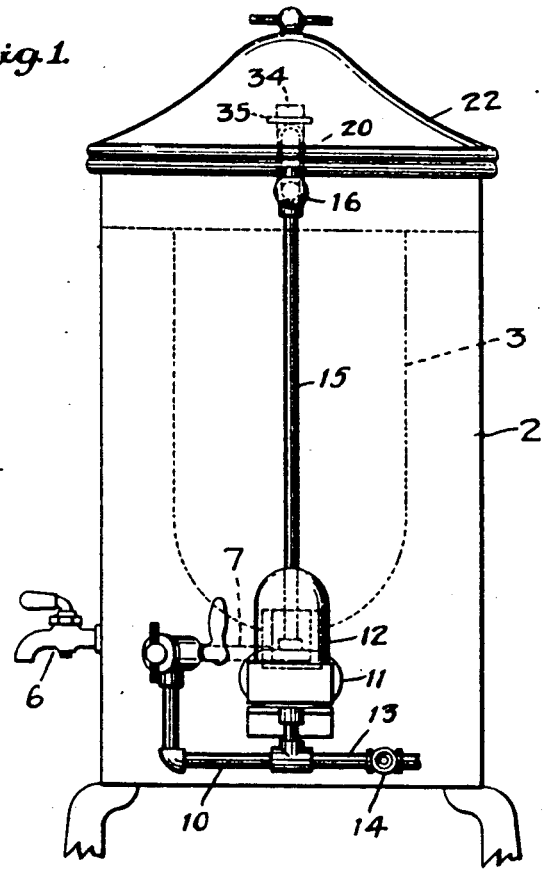
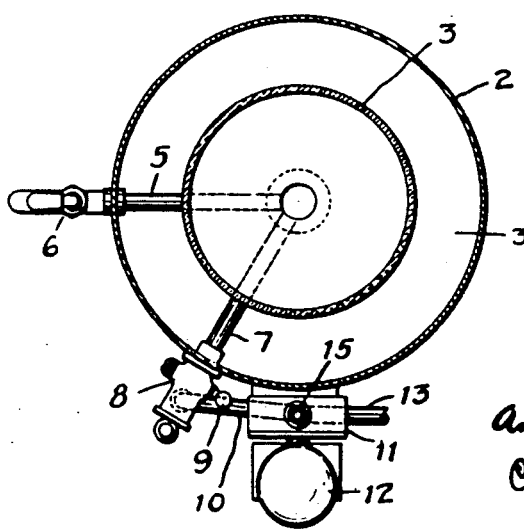
INVENTOR
Anton Kleinlercher
BY
ATTORNEY

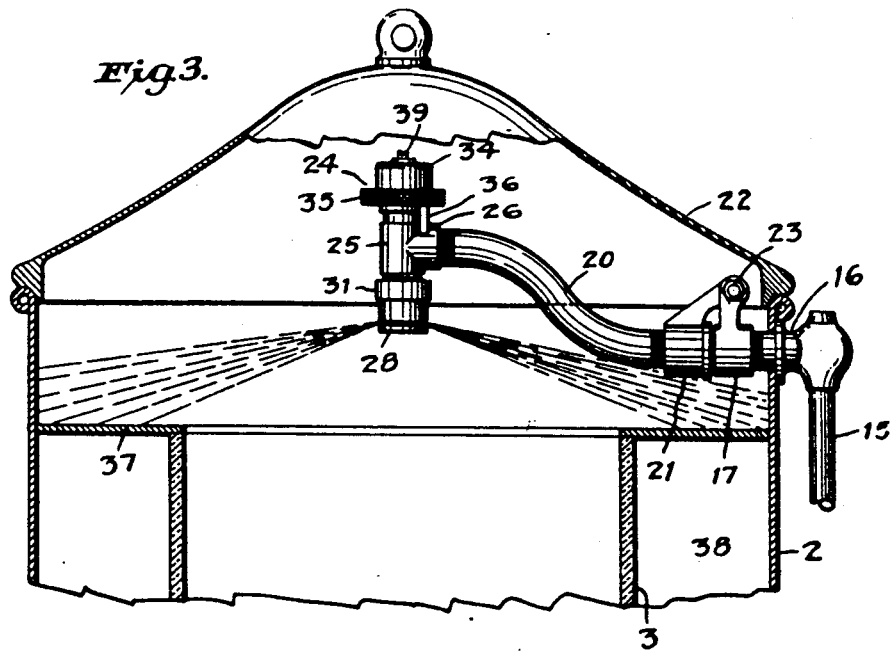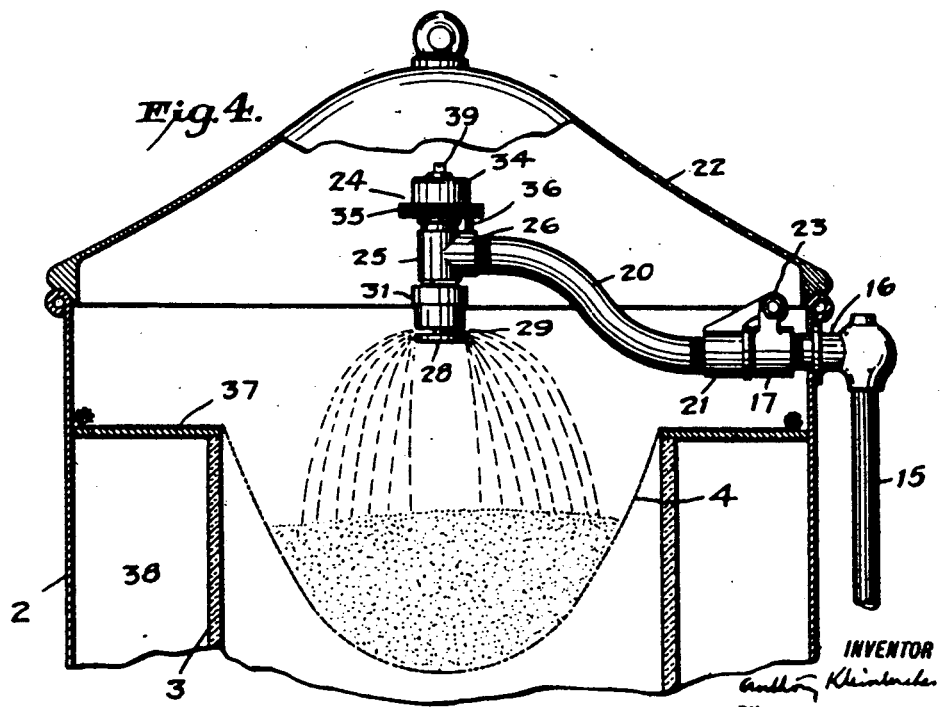

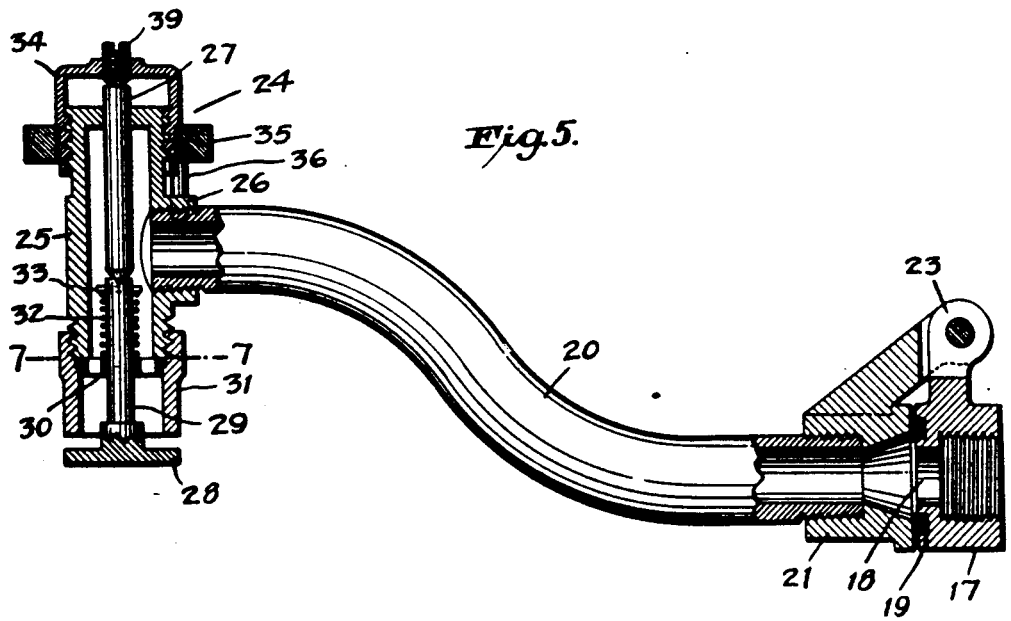
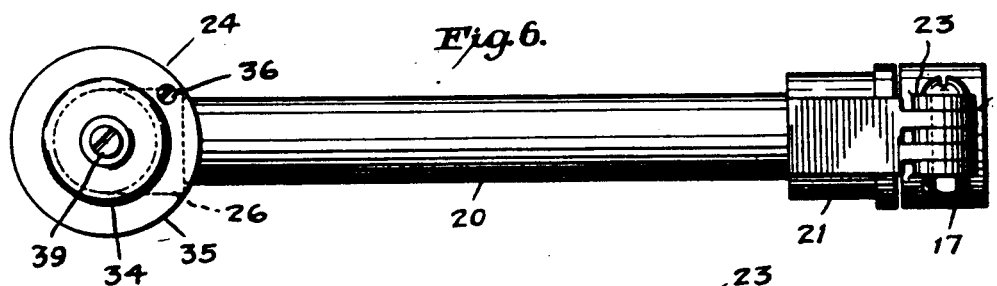
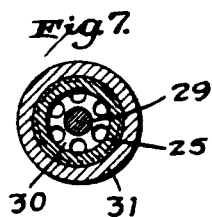
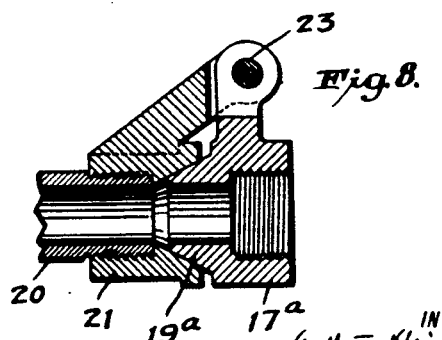

Patented Aug. 14, 1928.

1,680,792

UNITED STATES PATENT OFFICE.

ANTHONY KLEINLERCHER, OF BROOKLYN, NEW YORK, ASSIGNOR TO AARON M. SLOSS, OF NEW YORK, N. Y.

COFFEE URN.

Application filed January 13, 1927. Serial No. 160,868.

It is known in coffee urns to provide a pump and piping for passing liquid from the bottom of the infusion receptacle to the top thereof to pass again through the coffee grounds held at the top of the receptacle and also for delivering hot water coming from a heater over the ground coffee in the first instance. It is also known to provide a distributer vessel on the end of a hinged conduit arm forming the terminal part of such piping in the top of the urn, the hinging of the arm enabling the arm and the distributer to be turned up out of the way when the coffee bag or holder is placed in the urn or removed.

An object of this invention is to improve the construction and relations in respect to the hinged conduit arm, whereby a simpler sturdier and more reliable result is obtained. Another object is to provide a novel and advantageous type of distributer, which can be readily set to deliver either a velocity jet laterally, or at a comparatively low or wide angle, suitable for cleansing the upper and interior parts of the urn, or a fall of liquid over the body of coffee in the bag as well as for adjustments in between the extreme positions.

In the accompanying drawings forming part hereof:

Fig. 1 is an elevation of a coffee urn embodying the invention;

Fig. 2 is a horizontal section;

Fig. 3 is a vertical sectional view of the upper part of the urn illustrating the operation resulting from one setting of the distributer;

Fig. 4 is a similar view, illustrating the operation resulting from another setting;

Fig. 5 is a view partly in vertical section and partly in elevation of the distributer, the hinged conduit arm, and the cooperating fitting;

Fig. 6 is a plan view of Fig. 5;

Fig. 7 is a section on the line 7—7 of Fig. 5; and

Fig. 8 is a fragmentary vertical sectional view illustrating a modification.

The body or shell 2 of the coffee urn contains an inner receptacle 3 for the infusion, a bag or grounds holder 4 being suspended in the top of this receptacle as usual. 5 is a draw-off pipe connected with an outlet in the bottom of the receptacle 3, extending outward through the side of the body and provided with the customary faucet 6.

Another pipe 7 is connected with the bottom outlet and extends horizontally to an opening in the wall of the body 2. A fitting 8 is applied to the end of this pipe, outside the body, and contains a turn-cock 9. Piping 10 extending from this fitting connects the same with the inlet of a pump 11, provided with a motor 12 for driving it. Another pipe 13, leading from a heater (not shown) and containing a cock 14 is provided for conducting hot water to the inlet side of the pump.

A pipe 15, which also preferably serves as a gauge-glass, extends upward alongside the body 2, and has a connection 16 at its upper end which enters through an opening in the wall near the top. A fitting 17 is screwed onto the inner end of this connection and is provided with a passage 18 surrounded by a compressible washer 19 held in a groove or seat in the face of the fitting.

A conduit arm 20 has a fitting 21 on its rear end formed to abut the face of the fitting 17 and the gasket carried thereby so as to form a tight connection by virtue of the weight or force tending to hold the conduit arm in its normal or working position. In the working position the arm extends inwardly over the top of the receptacle 3 and the bag 4, approximately to the center thereof; but when the cover 22 is removed the arm can be turned upward and backward out of the way to permit the removal and replacement of the bag.

The fittings 17 and 21 are connected at the top by an offset hinge 23, so that the conduit connection is automatically broken when the arm is raised and automatically restored when the arm is lowered, the abutment of the sections serving to hold the arm positively against dropping below the normal position.

On the delivery end of the arm 20 there is a distributer head 24. This head is advantageously constructed with a cylindrical body 25 having a lateral internally threaded boss 26 intermediate its ends whereby it is mounted in a vertical position on the end of the conduit arm, the lower end of this body or shell being open, and the upper end being closed except for an opening in which a thrust-rod 27 is slidably guided.

A vertically movable distributer disc 28 lies directly beneath the mouth of the distributer body 25, this disc having a stem 29 which extends upward within the body and is guided in a spider or perforated disc 30, said perforated disc being advantageously held between the main piece of the distributer body and a screwed-on terminal piece 31. A spring 32 confined under compression between the perforated disc 30 and a cross-pin 33 in the upper portion of the stem 29 urges the disc 28 upward toward the mouth of the distributer head.

An operating nut or screw member 34 has running engagement with a screw-thread on the upper end of the distributer body 25, so that the member may be turned up and down by hand. A knurled rim 35 fixed to or formed with the member provides for convenient manipulation.

The thrust-pin 27 is interposed between the top of the operating nut 34 and the upper end of the stem 29, with the result that screwing the nut down thrusts the disc farther away from the mouth of the distributer head, while screwing it up causes the disc to approach the mouth more closely under the action of the spring 32. A stop pin 36 depending from the rim 35 is arranged to contact with one side or the other of the boss 26, thereby limiting the operating nut to a movement of somewhat less than a revolution, the limits being such in relation to the pitch of the treads of the nut that when the nut is turned up as far as it will go, the disc 28 is brought into close proximity to the rim of the nozzle 31, leaving an annular, laterally directed, narrow or slit-like orifice, as seen in Fig. 3, while when the nut is turned in the other direction as far as it will go, a comparatively wide opening, shown in Fig. 4, is afforded.

In the position of Fig. 3, a high velocity spray will be delivered laterally all directions, at a comparatively low or wide angle, when the pump 11 is in operation drawing hot water from the heater, with the valve 14 open and the valve 9 closed. This spray serves for cleansing the interior of the urn, including the ledge 37 which closes the top of the water chamber 38 which is formed between the infusion receptacle and the body or casing 2. By screwing the nut down slightly the widening of the slit orifice will cause the spray to strike somewhat lower, against the sides of the receptacle 3, the bag 4 having, of course, been lifted out before cleaning.

When the bag is in place, with a charge of coffee in it, and when the operating member is turned to the other extreme position, the liquid will be delivered in an umbrella spray or fall over the body of coffee, as seen in Fig. 4, giving excellent distribution for rapid extraction of the flavor and economical use of the coffee. Any desired intermediate form of spray and any desired coverage can be obtained by adjustment between the extreme positions, but the provision of the predetermined limits enables the distributer to be set readily for either a cleansing spray or an extracting fall without careful manipulation.

In order to enable the operating conditions to be the more accurately predetermined, a fine adjusting screw 39 is set into the top of the member 34 to bear against the upper end of the rod 27, this screw having a kerf so that it can be turned by a screw-driver.

In the condition shown in Fig. 4, in which liquid is being delivered over the coffee, it will be understood that the liquid may be either partial strength infusion taken from the bottom of the receptacle 3 or hot water drawn through the piping 13.

Fig. 8 illustrates a modification of the make-and-break coupling at the hinge of the conduit arm 20. In this form the fitting 17$^a$ has a conical nose 19$^a$ which fits a corresponding socket in the member 21 to form a sufficiently tight joint when the arm is in normal position.

While the preferred embodiment of the convertible adjustable distributer head has been described in detail, it will be understood that the form may be varied widely without departing from essentials.

What is claimed as new is:

1. In a coffee urn, a body containing an infusion receptacle at the top of which the ground coffee is held, means for supplying liquid to the top of the body, a distributer head in the top of the body supplied by said means, and a member in connection with said distributer operable to cause the delivery of either a velocity spray laterally for cleansing or a distributed fall of liquid upon the coffee.

2. In a coffee urn, a body containing an infusion receptacle at the top of which the ground coffee is held, means for supplying liquid to the top of the body, a distributer head in the top of the body supplied by said means, said distributer head having its mouth at the bottom and a deflector at said mouth, and means for relatively moving the distributer head and its deflector either into proximity to form a narrow lateral spray exit or into more widely spaced relation to cause a distributed fall of liquid upon the coffee.

3. In a coffee urn, a body containing an infusion receptacle at the top of which the ground coffee is held, means for supplying liquid to the top of the body, a distributer head in the top of the body supplied by said means, said distributer head having its mouth at the bottom and a deflector at said mouth, means for relatively moving the distributer head and its deflector either into proximity to form a narrow lateral spray exit or into more widely spaced relation to cause a distributed fall of liquid upon the coffee, and means limiting extreme relative positions of the parts to determine a lateral velocity spray for cleansing and the distributed fall, respectively.

4. In a coffee urn, a body containing an infusion receptacle at the top of which the ground coffee is held, means for supplying liquid to the top of the body, a distributer head in the top of the body supplied by said means, said distributer head having its mouth at the bottom, a deflector disc raisable and lowerable at said mouth, an operating device on the head, and a connection extending from said distributer disc upwardly within the head to cooperate with said operating device.

5. In a coffee urn, a body containing an infusion receptable at the top of which the ground coffee is held, means for supplying liquid to the top of the body, a distributer head in the top of the body supplied by said means, said distributer head having its mouth at the bottom, a deflector disc raisable and lowerable at said mouth, a spindle extending upward from said disc within said head, a spring acting on said spindle to raise the same, a screw operating device on the head, and a thrust-rod between said operating device and said spindle.

6. In a coffee urn, a body containing an infusion receptacle at the top of which the ground coffee is held, means for supplying liquid to the top of the body, a distributer head in the top of the body supplied by said means, said distributer head having its mouth at the bottom, a deflector disc raisable and lowerable at said mouth, a spindle extending upward from said disc within said head, a spring acting on said spindle to raise the same, a screw operating device on the head, a thrust-rod between said operating device and said spindle, and an adjustment screw between said operating device and said thrust-rod.

7. In a coffee urn, a body containing an infusion receptacle at the top of which the ground coffee is held, an outlet from the bottom of the receptacle, a pump, valved piping connecting said outlet with the inlet of the pump, valved hot-water supply piping also connected with the inlet of the pump, piping leading from the outlet of the pump to the top of the body, a distributer inside the top of the body, and means for controlling said distributer to cause the delivery of either a lateral velocity spray for cleansing or a distributed fall of liquid upon the coffee.

ANTHONY KLEINLERCHER.